United States Patent [19]

Kitzinger et al.

[11] 4,059,016
[45] Nov. 22, 1977

[54] FROTH LEVEL MONITOR

[75] Inventors: Frank Kitzinger, Montreal; Frank Rosenblum, Ville St. Laurent, both of Canada

[73] Assignee: Noranda Mines Limited, Toronto, Canada

[21] Appl. No.: 721,770

[22] Filed: Sept. 9, 1976

[30] Foreign Application Priority Data

May 6, 1976 Canada .................................. 251933

[51] Int. Cl.² ............................................. G01F 23/24
[52] U.S. Cl. ................................................. 73/304 R
[58] Field of Search ..................................... 73/304 R

[56] References Cited

U.S. PATENT DOCUMENTS 3,911,744 10/1975 Edwards ............................ 73/304 R
3,935,739 2/1976 Ells ..................................... 73/304 C Primary Examiner—S. Clement Swisher
Attorney, Agent, or Firm—Fleit & Jacobson

[57] ABSTRACT

A froth level monitor is disclosed. The froth level monitor comprises a plurality of electrically conductive electrodes spaced in the vertical direction and adapted to contact the top of the froth in sequence as the level of the froth rises, a constant current source connected to each electrode and capable of generating a constant current when its associated electrode is in contact with the froth, and a summing and time averaging current to voltage converter connected to the output of all the constant current sources for summing up all the currents as an indication of the number of electrodes in contact with the froth and for averaging with respect to time the variations in froth level so as to provide an indication of the mean level of the froth.

7 Claims, 2 Drawing Figures

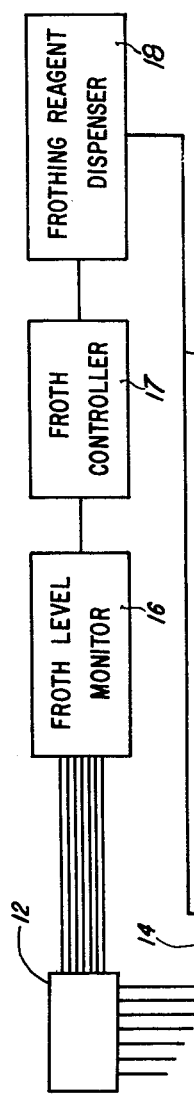
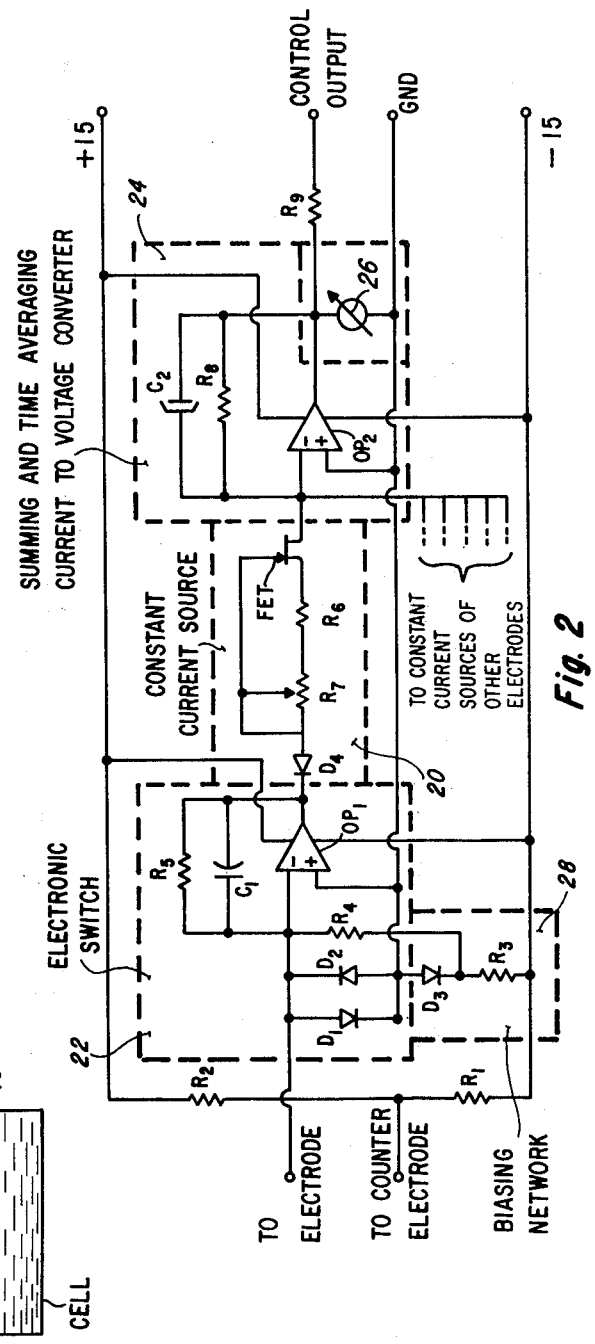

FROTH LEVEL MONITOR

This invention relates to a froth level monitor for detecting and automatically controlling the level of the froth in a flotation cell.

As commonly known in the industry, flotation cells are normally used for the separation of mineral ores. In such cells, the liquids containing the solids to be separated are aerated and agitated in the presence of a frothing reagent. This causes the formation of a layer of froth on top of the liquid in which is concentrated the desired mineral. The froth layer is usually skimmed from the edge of the cells into a separate container where the froth is allowed to collapse and the solids separated.

The efficiency of a flotation process can be kept closer to optimum if the froth level is kept at a constant height. The mean froth level therefore has to be sensed by a suitable instrument and a control signal provided to a frothing reagent dispenser to properly regulate the frothing reagent additions to the flotation cells.

In the past, various attempts have been made to design mechanical and electrical devices for measuring and controlling the level of froth in flotation cells. Examples of such devices are the air bubbler tubes and the capacitance proximity probes as disclosed in U.S. Pat. No. 3,471,010 issued Oct. 7, 1969. The above devices have however not been found entirely satisfactory in measuring the mean level of the froth because of the foamy nature of the froth which offers very little physical resistance and because the turbulent surface of the froth causes short-term level variations which have to be ignored in order to measure the real effect of frothing reagent additions.

It is therefore the object of the present invention to provide a froth monitor which could sense the mean froth level and provide a control signal for adequately regulating the frothing reagent additions.

The froth level monitor, in accordance with the invention, comprises a plurality of electrically conductive electrodes spaced at different levels in the vertical direction and adapted to contact the top of the froth in sequence as the level of the froth rises, a constant current source connected to each electrode and capable of generating a constant current when its associated electrode is in contact with the froth, and a summing and time averaging current to voltage converter connected to the outputs of all the constant current sources to provide an output corresponding to the sum of the currents of all the current sources as an indication of the number of electrodes in contact with the froth and for averaging with respect to time the variations in froth levels so as to provide an indication of the mean level of the froth.

An electronic switching device is preferably connected between each current source and its associated electrode so as to render the constant current source non sensitive to conductivity of the froth. A suitable electronic switching device may be an operational amplifier capable of generating a predetermined negative potential when its associated electrode is in contact with the froth and a predetermined positive potential when its associated electrode is out of contact with the froth.

The constant current source may consist of a field effect transistor having a gate electrode connected to the output of the operational amplifier for generating a constant current when the output of the operational amplifier goes negative, and further comprise a reverse connected diode interconnecting the field effect transistor to the operational amplifier for preventing conduction of the field effect transistor when the output of the operational amplifier goes positive.

The summing and time averaging current to voltage converter may include an operational amplifier having an input connected to the output of all the constant current sources so as to sum up all the currents as an indication of the total number of electrodes in contact with the froth. Such operational amplifier includes a capacitor of preselected value connected in its feedback loop for averaging with respect to time the current variations so as to provide an indication of the mean level of the froth.

The output of the froth level monitor may be connected to any suitable controller which may itself be connected to an adequate frothing reagent dispenser to regulate the amount of frothing reagent added to the flotation cells.

The invention will now be disclosed, by way of example, with reference to a preferred embodiment thereof illustrated in the accompanying drawings in which:

FIG. 1 illustrates a block diagram of a froth level control system; and

FIG. 2 illustrates a detailed circuit of a froth level monitor in accordance with the invention.

Referring to FIG. 1, there is shown a schematic diagram of an apparatus for controlling the level of the froth in a cell 10. The apparatus comprises a plurality of electrodes 12 adapted to contact the top of the froth 14 in sequence as the level of the froth rises, a froth level monitor 16 connected to the electrodes and a froth controller 17 connected to the output of the froth level monitor for controlling a frothing reagent dispenser 20 which regulates the amount of frothing reagent added to the flotation cell 10 as indicated by line 19.

The froth level monitor, in accordance with the invention, is illustrated in FIG. 2. A constant current source 20 is connected to each electrode through an electronic switch 22. The output of all the constant current sources are connected to a summing and time averaging current to voltage converter 24 the output of which is connected to a suitable indicator meter 26, such as a bar indicator, and to the froth controller 17 of FIG. 1.

The electronic switch 22 consists of an operational amplifier OP1 which is operated from a source of +15 volts and a source of −15 volts in a conventional manner. The positive or non-inverting input terminal of the operational amplifier is grounded whereas its negative or inverting input terminal is connected to an electrode 12. A voltage divider consisting of resistors R1 and R2 is connected across the sources of +15 and −15 volts so as to apply a voltage of about 10 volts to the counter electrode of electrodes 12 (usually the longest electrode). Oppositely connected diodes D1 and D2 are connected across the positive and negative inputs of operational amplifier OP1 for protecting the amplifier in known manner. The operational amplifier is negatively biased by a biasing network 28 consisting of diode D3 connected in series with resistor R3 across the −15 volts source and ground. The biasing network is designed to provide a slightly negative biasing potential (about −0.7 volt) to the negative input terminal of the operational amplifier through resistor R4 when the electrode is out of contact with the froth. This potential is amplified by the operational amplifier in the ratio of resistor R5, connected in the feedback loop of the amplifier, to the resistor R4 so as to provide an output of about +1.4 volts when the electrode is out of contact with the froth. However, when the froth touches the electrode, a slightly positive potential (about 0.7 volt) is applied to the negative terminal of the operational amplifier and this potential is amplified in the ratio of the value of the resistance of resistor R5 to the sum of the resistances of the electrode and the froth itself. This ratio is fairly high as the resistance of the electrode and froth is low. Therefore, the operational amplifier OP1 is fully saturated to provide an output of slightly less than −15 volts. Capacitor C1 connected across resistor R5 acts as a high frequency filter in known manner. The use of switching device 22 interconnecting the constant current source and the electrode renders the monitor substantially insensitive to conductivity of the froth as the operational amplifier provides an output which goes from 0 to full saturation in a very short time no matter the amplitude of the input signal applied thereto.

The constant current source 20 consists basically of a field effect transistor FET, a diode D4, a fixed resistor R6 and a variable resistor R7. The gate of the field effect transistor is biased by the voltage drop across the fixed resistor R6 and variable resistor R7 so as to provide a constant current output as soon as current starts to flow through diode D4 when the output of the operational amplifier OP1 goes negative.

The summing and time averaging current to voltage converter consists of an operational amplifier OP2 which is connected to the +15 and −15 volts sources. The positive input terminal of the operational amplifier is grounded whereas its negative input terminal is connected to all the constant current sources so as to sum up all the currents as an indication of the total number of electrodes in contact with the froth. The gain of the operational amplifier is controlled by resistor R8 and is selected so as to provide a full deflection of meter 26 when all the electrodes are in contact with the froth. The output of the operational amplifier OP2 is also connected to froth controller 17, as mentioned previously, through output resistor R9.

A capacitor C2 is connected across resistor R8 to act as a time averaging device. As it will be easily understood, the turbulent surface of the froth causes short term variations in the input of the operational amplifier OP2. Such variations are in the form of a series of steps. These short term variations have to be rejected in order to measure the real effect of frothing reagent additions. Therefore, capacitor C2 connected across resistor R8 is continuously charged and discharged and thus causes the operational amplifier to provide an output which averages with respect to time those short-term variations. This type of current averaging system is well suited to the conditions encountered in a typical flotation cell. It has been found that the turbulent surface of the froth provides finer resolution of the mean level because of the time and level averaging through the constant current and current averaging circuits. Typically, a ±0.25 in. control accuracy can be achieved with electrode length decrements of 0.75 in.

It will be easily understood that the output signal of the summing and time averaging current to voltage converter can be made a linear or a non-linear function of the mean froth level depending on the chosen decrements of the electrode lengths. In addition, the electrodes can be connected in any order in the circuit when a linear froth level to output signal voltage is selected.

It is also to be understood that the electronic switch, the constant current source and the summing and time averaging current to voltage converter disclosed in FIG. 2 are only by way of example and that other types of electronic switches, constant current sources and summing and time averaging current to voltage converters can be used.

The controller section of the froth level control system may be of any type. It is preferably adjustable to the time constant of different flotation circuits. The set point of the controller can be adjusted manually or by a process control computer.

What is claimed is:
1. A froth level monitor comprising:
   a. a plurality of electrically conductive electrodes spaced in the vertical direction and adapted to contact the top of the froth in sequence as the level of the froth rises;
   b. a constant current source connected to each electrode and capable of generating a constant current when its associated electrode is in contact with the froth; and
   c. a summing and time averaging current to voltage converter connected to the outputs of all said constant current sources for summing up the currents as an indication of the total number of electrodes in contact with the froth and for averaging with respect to time the current variations so as to provide an indication of the mean level of the froth.

2. A froth level monitor as defined in claim 1, further comprising an electronic switching device interconnecting each constant current source to its associated electrode so as to permit the constant current source to provide an output which is substantially independent of the froth conductivity.

3. A froth level monitor as defined in claim 2, wherein said electronic switching device includes an operational amplifier capable of generating a predetermined negative potential when its associated electrode is in contact with the froth and a predetermined positive potential when its associated electrode is out of contact with the froth.

4. A froth level monitor as defined in claim 3, wherein said constant current source includes a field effect transistor having its gate electrode connected to the output of the operational amplifier for generating a constant current when the output of the operational amplifier goes negative, and further comprising a reverse connected diode interconnecting said field effect transistor to the operational amplifier for blocking conduction of the field effect transistor when the output of the operational amplifier is positive.

5. A froth level monitor as defined in claim 4, wherein said summing and time averaging current to voltage converter includes an operational amplifier having an input connected to the output of all the constant current sources so as to sum up all the currents as an indication of the total number of electrodes in contact with the froth.

6. A froth level monitor as defined in claim 5, wherein said operational amplifier includes a capacitor of predetermined value connected across its feedback loop for averaging with respect to time the current variations at the input thereof so as to provide an indication of the mean level of the froth.

7. A froth level monitor as defined in claim 1, further comprising a controller connected to said summing and time averaging current to voltage converter to control the amount of frothing reagent to be added to a flotation cell.

* * * * *